United States Patent [19]

Bogue

[11] Patent Number: 4,550,520

[45] Date of Patent: Nov. 5, 1985

[54] FISHING POLE HOLDER

[76] Inventor: Carl E. Bogue, 11402 E. 10th, Independence, Mo. 64054

[21] Appl. No.: 642,087

[22] Filed: Aug. 20, 1984

[51] Int. Cl.[4] ............................................. A01K 97/10
[52] U.S. Cl. .................................... 43/21.2; 248/512; 248/533
[58] Field of Search .................. 43/21.2; 248/512, 530, 248/532, 533, 520, 528, 529, 511, 163.1, 165, 188

[56] References Cited

U.S. PATENT DOCUMENTS

| | | |
|---|---|---|
| 440,727 | 11/1890 | Sheafe . |
| 2,869,814 | 1/1959 | Hurlimann . |
| 2,899,155 | 8/1959 | Rogers ................................. 248/529 |
| 2,973,929 | 3/1961 | Zawadzki . |
| 3,054,508 | 9/1962 | Lovella ................................. 211/45 |
| 3,204,899 | 9/1965 | Danielewicz . |
| 3,327,978 | 6/1967 | Gates . |
| 3,385,544 | 5/1968 | Barnett ................................. 248/513 |
| 3,515,263 | 6/1970 | Carlson ................................. 43/21.2 |
| 3,538,906 | 11/1970 | Heraty ................................. 248/188 |
| 3,701,504 | 11/1972 | Woods et al. ........................ 248/528 |
| 4,133,131 | 1/1979 | Davy ................................... 43/21.2 |

Primary Examiner—Gene P. Crosby
Attorney, Agent, or Firm—D. A. N. Chase; Michael Yakimo, Jr.

[57] ABSTRACT

A fishing pole holder comprising a main cylindrical support having a plurality of leg members rotatably mounted thereto. Each leg member is separately rotatable about the support to allow the user to selectably incline the legs relative to the support and with the underlying surface in order to elevate the main support in a stabilized position on variously sloped underlying surfaces. A stirrup member for each rod is further rotatable about the support so as to receive a portion of an inclined fishing pole having one end contacting the underlying surface and extending over the support. The leg members are releasably fastened to the support and are stored within its hollow core allowing for easy transport of the holder from site-to-site.

8 Claims, 4 Drawing Figures

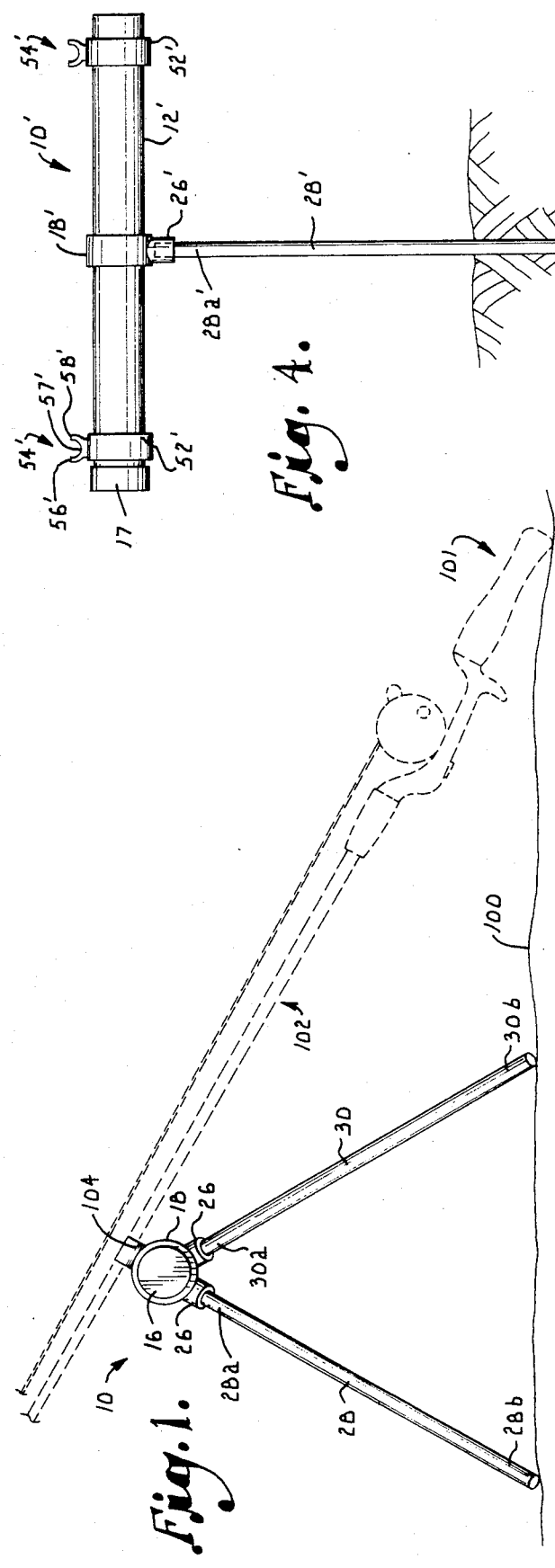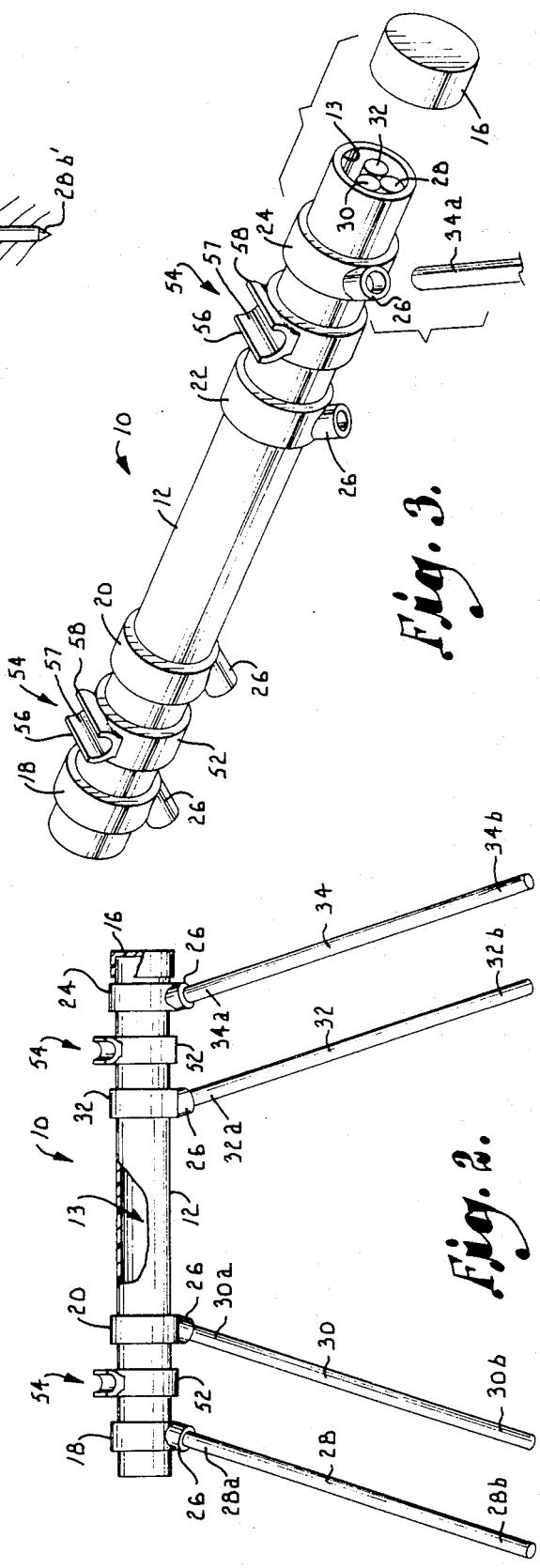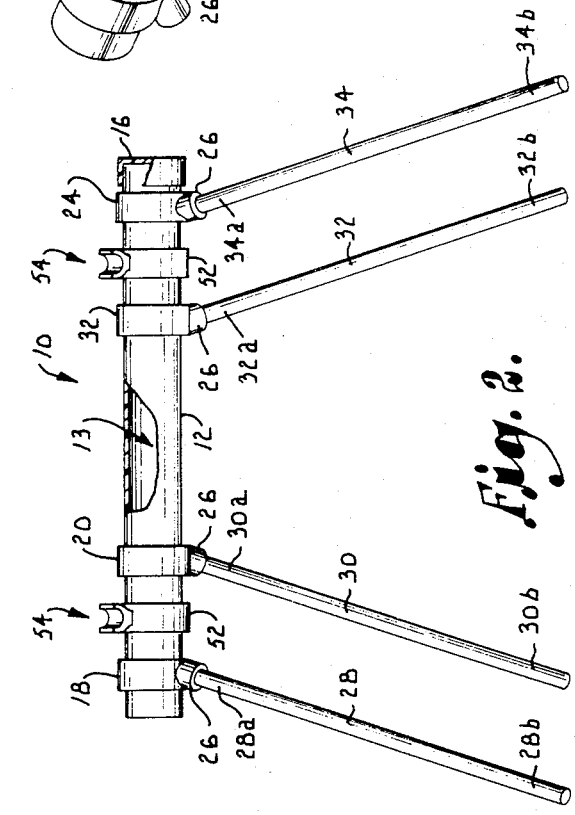

FISHING POLE HOLDER

BACKGROUND OF THE INVENTION

This invention relates to a fishing pole holer and more particularly to a holder adaptable for use with variously sloped underlying surfaces.

Various holders for fishing poles/rods have been designed to hold the pole in a functional position while freeing the hands of the fisherman. Although presumably effective in their operation, many of these fishing pole holders are relatively complex in construction, cumbersome to transport and difficult to assemble and dissasemble. Moreover, the configuration of such devices does not allow for its convenient storage in a fishing tackle box or the like. Finally, the complexity of the construction of past devices tends to result in a high manufacturing cost.

More particularly, it is desirable to have a fishing pole holder which is adaptable to engage variously-sloped underlying surfaces whether a fishing pier, bridge, lake shore or river bank. This adaptation is desirable so as to stabilize the holder irrespective of a range of reasonable slopes of the underlying surface. Moreover, it is desirable to provide a holder which enables the user to extend the fishing pole at a desired inclination relative to the underlying surface and over the adjacent body of water.

In response thereto I have invented a novel fishing pole holder which utilizes a primary cylindrical support member which inferiorly traverses the supported fishing rod/ pole. In my preferred embodiment four ring members are rotatably mounted about this cylindrical support with each ring member having a socket therein for releasable reception of the upper end of a leg member therein. Each ring member is separately rotatable about the cylindrical support so as to extend each leg member at a selectable angle away from the cylindrical support and into a selectable angular relationship and supporting contact with the underlying surface. The ability to separately position each leg member at a desired inclination, relative to the underlying slope, provides for a stabilized elevation of the main cylindrical support above variously-sloped surfaces.

At least one stirrup member is rotatably mounted about the longitudinal axis of the support member for receiving a longitudinal portion of the superiorly positioned fishing rod therein. The selectable rotation of the stirrup member allows for a positive engagement of a longitudinal portion of the fishing pole irrespective of the inclination of the fishing rod relative to the underlying surface. This selectable rotation of the stirrup cooperates with the selectable rotation of the associated ring, socket and leg members so as to present a stabilized holder to the fishing pole.

The cylindrical support member is preferably hollow in construction with releasable cap members at one end thereof. Upon release of the leg members from their sockets, they are easily stored within the hollow support member allowing for convenient storage in a fishing tackle box and easy transport from site to site.

It is therefore a general object of this invention to provide a fishing pole holder adaptable for use on docks, piers, river banks and other underlying surfaces of various reasonable slopes.

Another object of this invention is to provide a fishing pole holder, as aforesaid, which has a plurality of separately adjustable leg members adaptable for supporting contact with an underlying surface of various slopes.

Still another object of this invention is to provide a fishing pole holder, as aforesaid, having a main support member which underlyingly traverses the supported fishing rod(s).

A further object of this invention is to provide a fishing pole holder, as aforesaid, which has a plurality of leg members rotatably mounted thereto with each of said leg members extendable at various user-selectable angles away from said support member.

A more specific object of this invention is to provide a stirrup which is rotatable above said support so as to support a longitudinal portion of said fishing rod therein.

Another object of this invention is to provide a fishing pole holder with said leg members, as aforesaid, being releasably engageable with said support member so as to allow for breakdown of said holder and transport of the same from site to site.

Still another object of this invention is to provide a hollow support member, as aforesaid, for storage of said released leg members therein.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 1 is a side elevation view of the fishing pole holder on a generally horizontal underlying surface;

FIG. 2 is a front plan view of the fishing pole holder in FIG. 1 with portions of the cylindrical support member broken away to show the hollow core for purposes of illustration therein;

FIG. 3 is a perspective view of the holder in a broken-down mode and showing the insertion of three legs of the fishing pole holder into the hollow support with the fourth leg exploded away from its associated socket;

FIG. 4 is an alternative embodiment of the fishing pole holder shown in FIGS. 1–3 utilizing only one leg member therein.

DESCRIPTION OF THE PREFERRED EMBODIMENT

Turning more particularly to the drawings, FIGS. 1–3 illustrate my now-preferred embodiment of the fishing pole holder 10 as comprising an elongated, cylindrical support 12 having a length allowing for insertion of a plurality of leg members 28, 30, 32 and 34 within the core 13 of support 12 (FIG. 3). The support 12 is preferrably constructed of a light-weight material allowing for flotation of the unit in water. Removable end caps 16 and 17 allow for insertion of the released leg members 28, 30, 32 and 34 into and from the core 13 of support 12.

Rotatably mounted about the cylindrical support 12 is a plurality of ring members 18, 20, 22 and 24 having a diameter allowing for insertion of the main support 12 therethrough. Each ring includes a canted socket 26 allowing for releasable reception of the upper ends 28a, 30a, 32a, 34a of the respective leg members 28, 30, 32 and 34 therein. The opposed longitudinally spaced-apart lower ends 28b, 30b, 32b, 34b of each leg member 28, 30, 32 and 34 contact the underlying basal surface 100 so as to elevate the support 12.

The rotation of the separate rings 18, 20, 22 and 24 allows the user to selectably position the canted socket 26 at a desired inclination with the imaginary central longitudinal axis passing through the support 12. (Note that the cant of the sockets 26 associated with legs 28, 30, and 32, 34 are in opposed directions relative to the vertical.) This selectable relationship of socket 26 allows the associated leg members 28, 30, 32 and 34 to likewise be selectably inclined relative to this imaginary central longitudinal axis. Accordingly, each leg 28, 30, 32, and 34 may be variously inclined depending on the slope of the underlying base surface 100. This selectable inclination of each leg 28, 30, 32, 34 allows the main support 12 to be elevated above underlying surfaces 100 of various slopes in a stabilized position so as to delimit the toppling thereof. Thus the ability to selectably adjust the legs 28, 30, 32 and 34 stabilizes the support 12 in a horizontally traverse position relative to a superiorly fishing rod or pole 100.

Further rotatably mounted about the support 12 is at least one stirrup 54 associated with a rotatable collar 52. Each stirrup 54 comprises spaced-apart, upstanding flanges 56, 58 with a web portion 57 therebetween. The rotable collar 52 positions the stirrup 54 about the elevated support 12 in a selectable relationship about the circumference of the support 12 and with the imaginary longitudinal axis passing therethrough.

Upon elevation of the support above the underlying surface 100 the stirrup 54 is rotated so that a longitudinal portion 104 of the inclined fishing rod 102 is received therein. As such the stirrup 54 can be selectably positioned so as to receive a portion 104 of the fishing rod between the flanges 56, 58 and in supporting contact with the web 57 irrespective of the inclination of the fishing pole 104 with the underlying surface 100. This selectable rotation of the stirrup 54 cooperates with the selectable rotation and adjustment of the plurality of leg members 28, 30, 32, 34 so as to support the inclined pole 102 and maintain the inclination thereof.

As shown in FIGS. 2 and 3 a plurality of stirrups 54 are mounted on the support 12. As such a plurality of fishing poles 102 may be so supported. As each stirrup 54 is individually, selectably rotatable a plurality of the fishing rod 102 of various lengths can be supported by the holder 10.

USE

During transport from site to site the leg members 28, 30, 32 and 34 are released from their respective friction fits within the sockets 26 and stored within the hollow core 13 of support 12 as shown in FIG. 3.

Upon arrival at the fishing site, cap 16 is removed and the upper ends 28a, 30a, 32a and 34a of legs 28, 30, 32 and 34 are fitted into the respective sockets 26. Depending upon the inclination of the underlying surface 100 from the horizontal, the ring members 18, 20, 22 and 24 are rotated about the support 12 so as to extend the leg members in selected directions from an imaginary vertical axis normal to the imaginary central longitudinal axis of the support 12. This several adjustability of each leg 28, 30, 32, 34 stabilizes the support proper 12 in an elevated position above the surface 100.

As shown in FIG. 1 the surface 100 is relatively flat. Thus the angle of the leg members 28, 30 (and hidden leg members 32 and 34) relative to the imaginary longitudinal and vertical axes 12, and the inclinations of the legs 28, 30 (32, 34) with the surface 100 are generally equal. As the slope of the surface 100 increases each leg member will have to be selectably rotated so as to form a proper angular relationship with the imaginary axes and underlying surface 100 so that support 12 can be elevated from the surface 100 in a stabilized position relative thereto. Although the extension/inclination of the front legs 28, 34 is shown as generally equal to those of the back legs 30, 32, irregular terrain may require all four legs to have different angular relationships with the underlying surface 100. Thus, the ability to selectably position each leg is preferred.

Once the support 12 has been elevated and stabilized above the surface 100, one end 101 of the fishing pole 102 contacts the surface 100 with the other end (not shown) placed in extension over the support 12 and towards the body of water. As such a portion 104 of the fishing pole 102 will pass superiorly adjacent the underlying support 12. Stirrup 54 is rotated so as to receive this portion 104 of the pole 102 therein in contact with the web 57 so as to offer a positive support thereto. Flanges 56, 58 preclude lateral shifting of the supported fishing pole 102.

It is noted that the ability to rotate the stirrup 54 about the support 12 allows for the above-described engagement of the stirrup 54 with pole portion 104 irrespective of the various functional inclinations of the pole with the support 12 and the underlying surface 100. As such, positive support of the pole 102 and preclusion of undesirable lateral shifting of pole 102 is continuously maintained.

An alternative embodiment 10' of the fishing pole holder is shown in FIG. 4 which utilizes only one leg member 28' having a pointed lower end 28b' for penetration into the underlying surface 100'. Again stirrups 54' with collars 52' are separately rotatable so that a portion 104 of the fishing pole 102 may be supported by the stirrup 54' and holder 10' in a manner as shown in FIGS. 1-3 with similar accompanying advantages and results.

It is understood that I also reserve the right to claim the ornamental design of the fishing pole holders as shown in FIGS. 1-4.

It is to be understood that while certain forms of this invention have been illustrated and described, it is not limited thereto, except in so far as such limitations are included in the following claims.

Having thus described the invention, what is claimed as new and desired to be secured by Letters Patent is:

1. A fishing pole holder comprising:
   a support member for said fishing pole, said support member having an imaginary longitudinal axis underlyingly traversing a fishing pole;
   a stirrup member for receiving a longitudinal portion of said fishing pole therein;
   a plurality of leg members having upper and lower ends for elevating said support member;
   a fastener member for engaging the upper end of each leg member thereto with said lower end contacting an underlying surface below said support member to elevate said support member from said surface;
   means for selectably positioning each fastener member about said support member in a manner to position each leg member at a selectable angular relationship with said surface so as to elevate said support member above said surface; and
   means for selectably positioning said stirrup about the perimeter of said support member so as to receive a portion of said fishing pole therein, said stirrup member cooperating with said elevated support member to maintain an inclination of said fishing pole having one end in contact with said surface and extending over said elevated support.

2. The device as claimed in claim 1, wherein said positioning means for said stirrup member comprises:
   a collar member, said collar member having an aperture therein for insertion of said support therethrough; and
   means for associating said stirrup to said collar whereby rotation of said collar selectably positions said stirrup about said support to receive said fishing pole portion therein.

3. The device as claimed in claim 1, wherein said positioning means for said fastener member comprises:
   a ring member, said ring member having an aperture therein for insertion of said support therethrough;
   means for associating said fastener member to said ring member whereby rotation of each ring selectably positions said fastener member about said support.

4. The device as claimed in claim 3, wherein said fastener member comprises a socket member presenting an aperture for a friction fit of said upper end of said leg member therein.

5. The device as claimed in claim 1, wherein said stirrup member comprises first and second upstanding flanges with a central web extending therebetween, said fishing pole portion resting on said central web with said flanges precluding lateral shifting of said fishing pole portion supported therein.

6. The device as claimed in claim 1, wherein said support member includes a longitudinal hollow core therein for insertion of said leg members therein upon disengagement from said fastener whereby to present storage means for said leg members.

7. The device as claimed in claim 6, further comprising cap means for closing the end of said hollow core whereby to maintain said stored leg members within said support during transport thereof.

8. A fishing pole holder comprising:
   a support member for said fishing pole, said support member having an imaginary longitudinal axis underlyingly traversing a fishing pole;
   a stirrup member for receiving a longitudinal portion of said fishing pole therein;
   at least one leg member having upper and lower ends for elevating said support member;
   a fastener member for engaging the upper end of at least one leg member thereto with said lower end having structure thereat for engaging an underlying surface below said support member to elevate said support member from said surface; and
   means for selectably positioning said stirrup about the perimeter of said support member so as to receive a portion of said fishing pole therein, said stirrup member cooperating with said elevated support member to provide a positive support to maintain an inclination of said fishing pole having one end in contact with said surface and extending over said elevated support.

* * * * *